Patented May 29, 1934

1,960,641

UNITED STATES PATENT OFFICE 1,960,641

CELLULOSE ARALKYL ETHER PLASTICS

Leon Lilienfeld, Vienna, Austria

No Drawing. Original application February 28, 1924, Serial No. 695,854. Divided and this application November 18, 1931, Serial No. 575,964

9 Claims. (Cl. 106—40)

My prior U. S. Patent No. 1,188,376 of June 20, 1916, describes and claims certain new substances, alkyl ethers of cellulose and of its derivatives and conversion products. The present invention is concerned with the aralkyl ethers, of which the benzyl ethers are hereinafter more particularly referred to, as specific examples of said class of substances. With the alkyl ethers, as stated in said prior patent, those in which a small number of the hydrogen atoms of the hydroxyl groups are replaced by alkyl radicals are soluble in cold water, whereas those ethers in which substantially all such hydroxyl hydrogen atoms are so replaced, are wholly insoluble in water, but are soluble in a great number of organic solvents. In contradistinction to this no aralkyl ethers of cellulose exist that are soluble in water. Aralkyl ethers (for instance benzyl ethers of cellulose) of lower degrees of aralkylation (i. e. such aralkyl ethers as contain only a small number of aralkyl groups) are insoluble both in water and in organic solvents whilst aralkyl ethers of cellulose of higher degrees of aralkylation (i. e. in which a great number of, or all hydroxyl hydrogen atoms of the cellulose are replaced by aralkyl groups) are insoluble in water, but readily soluble in a large range of organic solvents as benzene, toluene, xylene, chloroform, tetrachloroethane etc. The solutions of such aralkyl ethers of cellulose, on drying, leave behind clear, transparent flexible films which display a remarkable resistance to water at all temperatures. Their dielectric constant is exceedingly low which circumstance renders them highly suitable for the production of insulating goods.

In general, the production of aralkyl ethers of cellulose, may be readily accomplished by causing aralkyl esters of inorganic acids, to act on cellulosic bodies or materials containing the same, in the presence of alkalies, or causing said esters to act on alkali-celluloses or alkali compounds of cellulose derivatives or conversion products. The methods of preparing these aralkyl ethers are fully described in my copending application Serial No. 695,854 filed February 28, 1924, of which the present application is a division (and which has now matured into Patent 1,858,019).

The benzyl ether so formed will be found to correspond approximately to the formula $C_{12}H_{16}O_{10}.4(C_6H_5.CH_2)$ to $C_{12}H_{14}O_{10}.6(C_6H_5.CH_2)$.

It is soluble in the following solvents: benzene, toluene, xylene, chloroform, tetrachloroethane and the like. It is insoluble or substantially insoluble in water and alcohol.

It is an object of the present invention to provide compositions of matter, and products prepared therefrom, containing aralkyl ethers of cellulose such as benzyl ether. Other objects will appear from a perusal of this specification.

The aralkyl ethers of cellulose can be used for various purposes, such as for making plastic compositions of the nature of celluloid-like masses, coating compositions, insulating compositions. In such compositions various additions such as filling materials, agents for increasing the plasticity (including camphor and substitutes therefor) suppleness, softness; pigments, dyes, etc. can be used, as in the known plastics from other cellulose derivatives. Volatile solvents can be used in the known manner.

Particular examples of such compositions are as follows:

Example 1—Plastic celluloid-like material 60 parts by weight of a cellulose benzyl ether soluble in benzene are mixed with 30 to 40 parts by weight of camphor and dissolved in 200 parts of benzene or chloroform, and kneaded in a vacuum kneading machine, for about two hours at a temperature of 60° C. Subsequently about half of the volatile solvent is evaporated, and the mass calendered (rolled out), dried, heated and pressed.

If desired a soluble dye or a pigment can be incorporated with the composition as given in this example. (This example is continued from my application 473,832 filed May 21, 1921).

Example 2

Another example of plastic compositions containing the aralkyl ethers of cellulose is the following which is continued from my application Serial No. 436,605 filed January 11, 1921, Patent No. 1,563,204 (corresponding to an Austrian application filed August 1, 1919). To 25 to 50 kgs. of one of the oils described in my application 436,382 of Jan. 11, 1921, (now Patent 1,563,203) are mixed 75 to 120 kgs. of water-insoluble benzyl cellulose ether with or without a solvent, and the mixture worked up in the manner usual in making celluloid-like masses.

Example 3

A further example derived from said application 436,605 is the following mode of making artificial leather. 30 parts of benzyl cellulose are mixed with 20 to 35 parts of one of said oils described and claimed in Serial No. 436,382, until a uniform paste or a solution is obtained. A pigment such as lamp black may be added. Fabric, paper or the like is coated with the mixture and calendered. In making this coating mixture, a volatile solvent such as benzene or chloroform can be added if desired.

In Examples 2 and 3 benzyl ether of starch can be substituted for the benzyl ethers of cellulose. The mixture as mentioned in this latter example can also be used for covering wires or cables, as an insulating coating.

The oils referred to in these last two examples can be produced as in my cases 436,384 and 436,605, namely, by treating high boiling coal tar oils, i. e. any coal tar hydrocarbons having boiling points above 140° C., and especially those boiling between 140 and 220° C., with acetylene in the presence of aluminium chlorid (0.5 to 10% of the latter, based on the amount of the tar oil being treated, being a suitable proportion to employ) and distilling the reaction mixture (optionally after a previous removal or decomposition of the aluminium chloride compound). The oil has a blue fluorescence, and the fractions boiling in vacuo (for example at a pressure of 20 millimeters) between about 85° C., and about 260° C., are especially suitable for the purpose.

The fractions of tar boiling above 140° C., which have been found particularly advantageous are the higher boiling fractions of solvent naphtha, or hydrocarbons which can be isolated therefrom.

*Example 4—Insulating product*

600 parts by weight of a water-insoluble cellulose benzyl ether are mixed with 400 parts by weight of tricresyl phosphate or of benzyl cresylether or of a high boiling aromatic hydrocarbon such as m-dixylylethane and dissolved in 2000 parts of toluene or benzene and kneaded in a vacuum kneading machine for about two hours at a temperature of 60 to 80° C. Subsequently about half of the volatile solvents is evaporated and the mass is (*a*) Either calendered (rolled out) dried, heated and pressed, or (*b*) Applied to wires or cables by means of suitable machinery and if necessary dried.

In the former case a laminiform insulating material, in the latter a wire or cable covered with a flexible insulating sheath, is produced.

(This example is continued from my application 473,833, filed May 21, 1921.)

I claim:

1. A plastic composition comprising an aralkyl ether of a carbohydrate of the empirical formula $n(C_6H_{10}O_5)$, and tricresyl phosphate.

2. A plastic composition comprising an aralkyl ether of cellulose and tricresyl phosphate.

3. A plastic composition comprising benzyl cellulose and tricresyl phosphate.

4. A plastic composition comprising approximately six (6) parts of benzyl cellulose and about four (4) parts by weight of tricresyl phosphate.

5. A plastic composition comprising an aralkyl ether of a carbohydrate of the empirical formula $n(C_6H_{10}O_5)$, and a phosphoric ester of a phenol.

6. A plastic composition comprising an aralkyl ether of cellulose and phosphoric ester of a phenol.

7. A plastic composition comprising benzyl cellulose and a phosphoric ester of a phenol.

8. A plastic composition comprising approximately six (6) parts of benzyl cellulose and about four (4) parts by weight of a phosphoric ester of a phenol.

9. A plastic composition comprising six (6) parts of benzyl cellulose and four (4) parts by weight of tricresyl phosphate.

LEON LILIENFELD.